United States Patent
Croak et al.

(10) Patent No.: US 7,415,010 B1
(45) Date of Patent: Aug. 19, 2008

(54) METHOD AND APPARATUS FOR PROVIDING CUSTOMER SPECIFIED SERVICE LOGIC

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 253 days.

(21) Appl. No.: 11/216,670

(22) Filed: Aug. 31, 2005

(51) Int. Cl.
*H04L 12/66* (2006.01)
(52) U.S. Cl. .................. 370/352; 370/353; 379/201.12
(58) Field of Classification Search ............ 379/201.12, 379/201.01, 201.03, 201.04; 370/352–356
See application file for complete search history.

(56) References Cited

U.S. PATENT DOCUMENTS

| | | | |
|---|---|---|---|
| 6,411,697 B1 * | 6/2002 | Creamer et al. | 379/201.12 |
| 6,856,676 B1 * | 2/2005 | Pirot et al. | 379/201.01 |
| 6,968,367 B1 * | 11/2005 | Vassar et al. | 709/219 |
| 7,139,263 B2 * | 11/2006 | Miller et al. | 370/352 |

* cited by examiner

*Primary Examiner*—Suhan Ni

(57) ABSTRACT

A method and apparatus for enabling the creation of customer specified service logic are disclosed. The method enables a service provider to define a plurality of pre-built blocks of service logic for constructing basic and advanced telephone services, to enable the customer to use the pre-built blocks to construct the service logic, to receive the service logic from the customer, to verify the accuracy and/or completeness of the service logic and to activate the service. This flexible approach allows a customer to select the exact package of services that the customer wishes to receive. The selected services match exactly the customer's need and allow the service provider to remain competitive.

20 Claims, 4 Drawing Sheets

METHOD AND APPARATUS FOR PROVIDING CUSTOMER SPECIFIED SERVICE LOGIC

The present invention relates generally to communication networks and, more particularly, to a method and apparatus for enabling the creation of customer specified service logic for packet networks such as Voice over Internet Protocol (VoIP) and Service over Internet Protocol (SoIP) networks.

BACKGROUND OF THE INVENTION

The Internet has emerged as a critical communication infrastructure, carrying traffic for a wide range of important scientific, business and consumer applications. Internet services are becoming ubiquitous and customers are combining both voice and data services on a single Internet based infrastructure such as a packet network e.g., a Voice over Internet Protocol (VoIP) network. VoIP service providers offer their customers an increasing array of enhanced services beyond the basic telephony service. These services are innovative and give the users more control over their telephony services. However, the applications for the enhanced services are prescribed and packaged as the service provider dictates. The service provider presents the limited set of options to the customer and the customer selects one of the options. Thus, the selected package may contain services the customer does not need and may lack other services the customer would prefer to include in the package.

Therefore, there is a need for a method and apparatus for providing customer specified service logic.

SUMMARY OF THE INVENTION

In one embodiment, the present invention discloses a method and apparatus for enabling the creation of customer specified service logic for packet network services such as VoIP and SoIP services. The method would enable the end customer to create a set of services for their package and to present the package to the service provider for activation. In one embodiment, the present invention enables the network service provider to define a set of key building blocks for constructing basic and advanced telephony services, to provide the key service building blocks to the customer along with tools, guidelines and/or a framework for using the service building blocks to construct the service logic, to certify the service logic created by the customer and to activate the service. In one embodiment, the service provider may offer the guidelines to the customer via a pop-up window, a web based interface, a natural language interface, a visual display interface and the like.

In one embodiment, the service provider offers tools for building the service logic. For example, the service provider can provide a tool with drag and drop capability to the customer and the customer can use the tool to build the service logic. The tool enables the end customer to specify and to create the set of services for their package and present the package to the service provider for activation. The service provider verifies the service logic and activates the service. This flexible approach allows a customer to select the exact package of services that the customer wishes to receive. The selected services match exactly the customer's need and allow the service provider to remain competitive.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for enabling the creation of customer specified service logic. Although the present invention is discussed below in the context of service requests for VoIP, the present invention is not so limited. Namely, the present invention can be applied for any service on a packet network.

Figure 1:
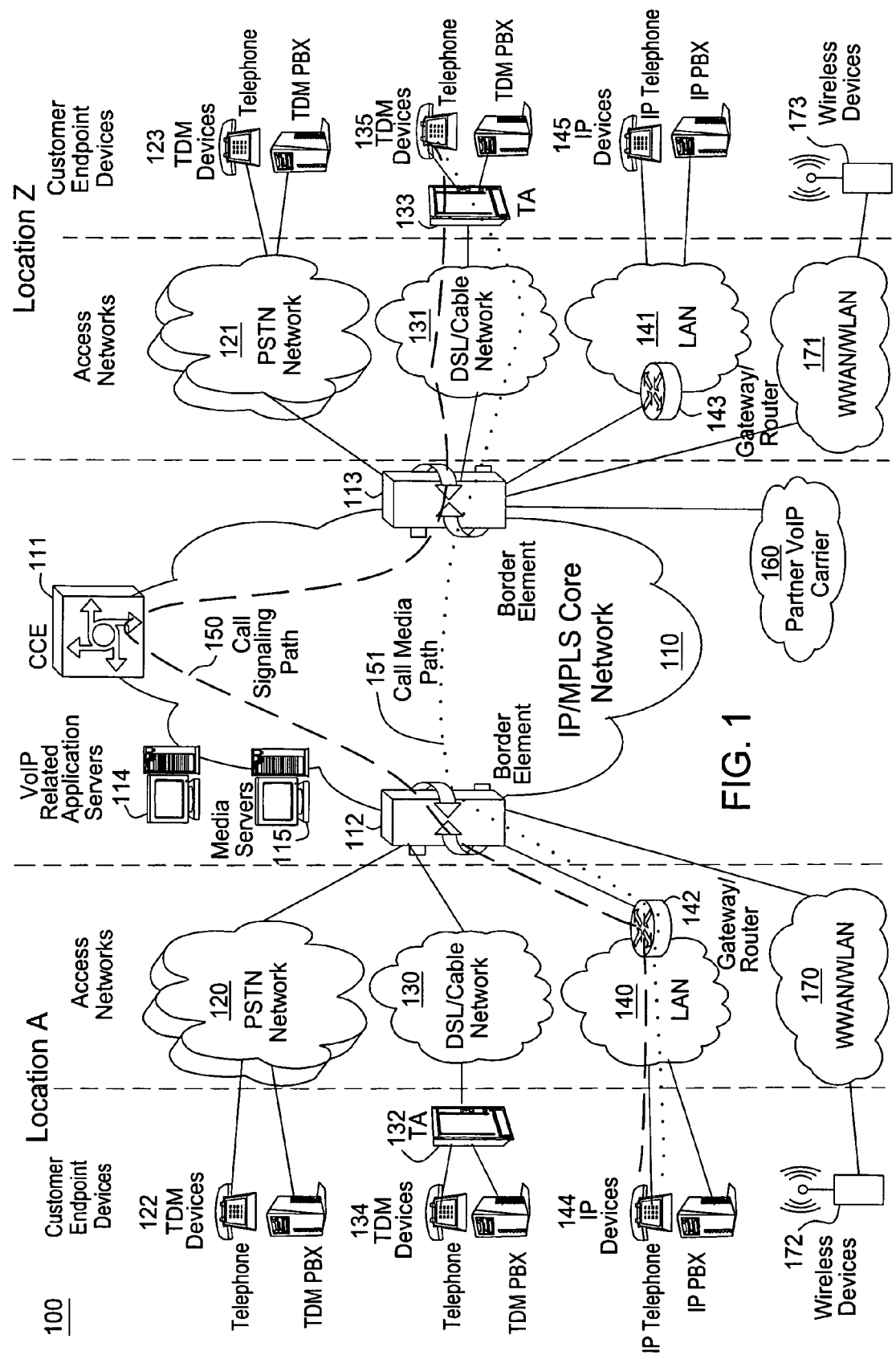
FIG. 1 illustrates an exemplary network related to the present invention.

To better understand the present invention, FIG. 1 illustrates a communication architecture 100 having an example network, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based, IP based or wireless such as cellular phones. TDM based customer endpoint devices 122, 123, 134, and 135 typically comprise of TDM phones or Private Branch Exchange (PBX). IP based customer endpoint devices 144 and 145 typically comprise IP phones or IP PBX. Wireless endpoint devices 172 and 173 typically comprise cellular phones, pocket PCs etc. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively. Wireless endpoint devices access VoIP services by using a Wireless Local Area Network (WLAN) or a Wireless Wide Area Network (WWAN). The WLAN/WWAN network is connected to the IP core network through the border elements 112 and 113.

The access networks for wired devices can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices. The access network for wireless devices can be WLAN, WWAN or an integrated WLAN/WWAN network.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which a variety of packet network based services such as VoIP and SoIP services can be offered to the enterprise and residential customers. The packet network based services offer more enhanced capabilities and more customer control than the traditional services such as PSTN. Although these services are innovative, the service provider packages the enhancements and basic capabilities and offers a limited set of options to the customers. It is therefore, advantageous to have a method and apparatus for enabling the creation of customer specified service logic. Namely, the present method would enable the service provider to allow the customer to specify the content of the service package and to request the activation of the customer defined service package. The service provider would then verify the accuracy and completeness of the requested service package and activate the service.

In order to clearly illustrate the teachings of the current invention, the following networking terminologies will first be described:
  Service creation;
  Service logic; and
  Pre-built block.

Service creation is a method of designing, implementing and deploying telecommunication services. For example, the creation of an Interactive Voice Response (IVR) menu for routing calls is creation of an IVR service on a media server. Service providers may add features to existing services and enhance existing services by using service creation methods. The service creation specifies and implements the flow of data and protocol interactions by creating service logic as defined below.

Service logic is a sequence of actions used to deliver the feature or the capability to the service. The service logic can be created either by coding the functions using programming languages such as Java, C++, etc. and executing the programs or by using a tool such as a Graphical User Interface (GUI) with pre-built blocks of the service logic and dragging and dropping to create the capability. Creating the service logic by coding in a programming language requires the network designer to know the programming language. However, it also has the disadvantage of having the designer repeat similar tasks for different features. In one embodiment, the present GUI method with pre-built blocks allows the designer to reuse the blocks for multiple features and requires less programming knowledge. The pre-built blocks are dragged, dropped and interconnected to create the flow for the service logic.

The pre-built blocks used to construct the service logic are service independent software components that execute a well-defined unit in the service. Several services can use the same pre-built blocks configured and interconnected in different ways. For example, a simple Instant Messaging (IM) service and a multimedia messaging service need to access a presence server. A pre-built block for initiating interaction with the presence server can be used for implementing both types of services. The service providers may then avoid having to recreate the same design for different services. The service creation method also provides a capability to configure each pre-built block to result in a specific flow or behavior for the feature or capability being delivered to the customer.

In sum, a service creation specifies and implements the flow of data and protocol interactions for delivering a service feature by creating service logic. The service logic can be created by coding the functions and flows of data using a programming language or by utilizing a GUI interface with pre-built blocks of the service logic. The pre-built blocks are service independent and usable by a broader base of designers.

In a traditional telecommunications network such as PSTN, the services are designed and implemented by the service provider. A packet network such as VoIP network offers more enhanced services and customer control than the traditional switched network. However, the service provider still packages the enhancements and basic capabilities and then offers the limited set of options to the customers. The current invention provides a novel method and apparatus for enabling the creation of customer specified service logic. The service logic is matched to the specific needs of the customer; and thus it is not restricted to a limited set of options.

In one embodiment, the present method enables the service provider to define pre-built blocks of a service logic for constructing basic and advanced telephone services, to enable the customer to use the pre-built blocks to construct the service logic, to provide customers framework and/or guideline for constructing the service logic, to receive the service logic from the customer, to verify the accuracy and completeness of the service logic and to activate the service. In one embodiment, the current invention for enabling the creation of customer specified service logic utilizes the GUI interface method. Thus, the user is not required to be a skilled programmer.

Figure 2:
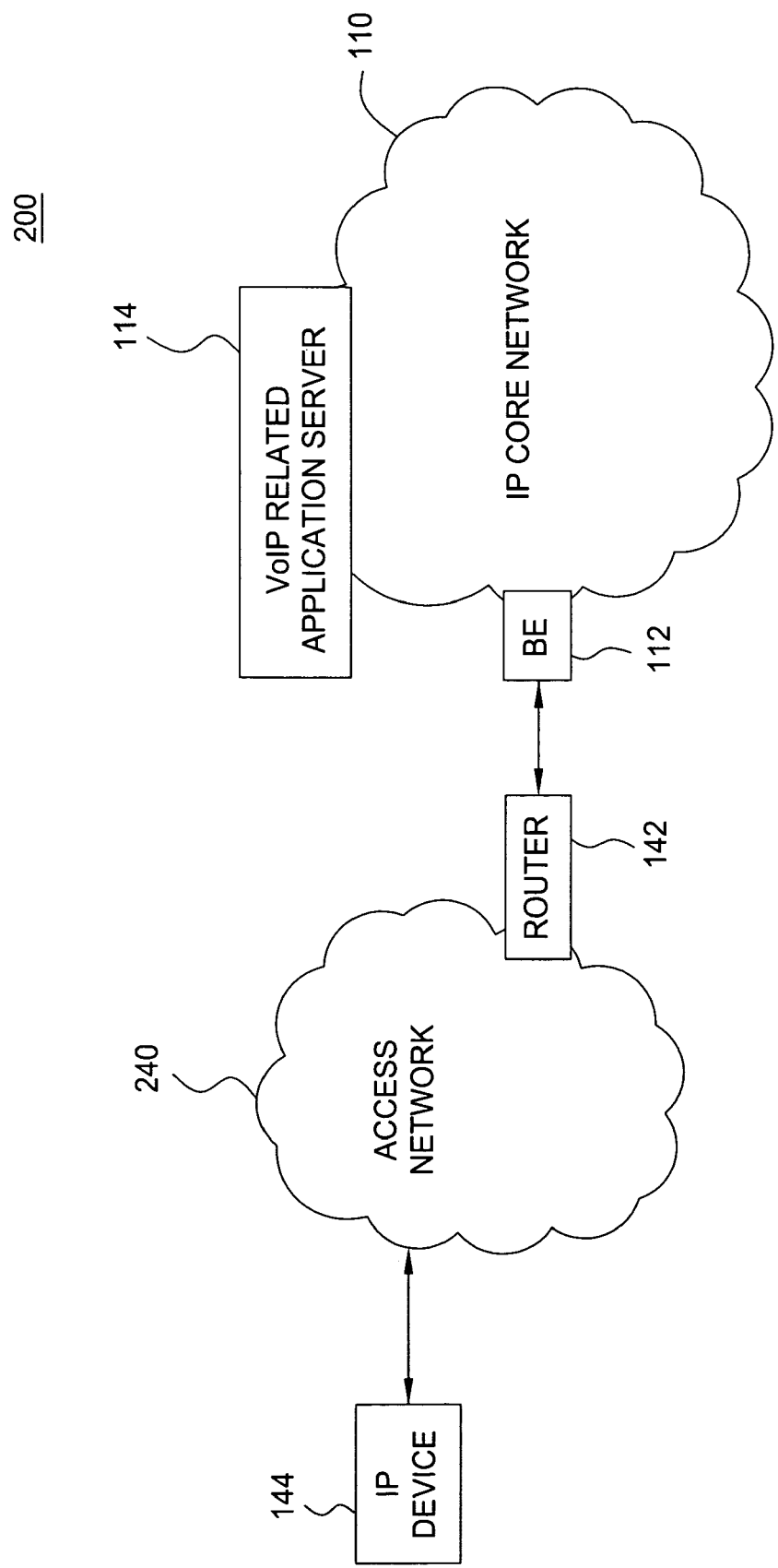
FIG. 2 illustrates an exemplary network with the capability to create a customer specified service logic.

FIG. 2 illustrates an exemplary network 200 with the present invention for creation of service logic by the customer. To illustrate, the customer is using the IP device 144 to access the IP services such as VoIP and SoIP services. IP device 144 is connected to the access network 240. The access network 240 contains a gateway router 142. The gateway router is connected to the IP/MPLS core network 110 through the border element 112. The VoIP application server 114 is deployed in the IP/MPLS core network. Note that only the network elements used to describe the invention are illustrated in FIG. 2. It is not intended to show all network elements used to deliver a VoIP service. In one embodiment, the application server 114 is used to enable the creation of customer specified service logic.

The service provider determines the basic and advanced services to be supported in the customer specified service logic. As the network is upgraded, the list of services to be supported can get expanded. For example, a conferencing capability may be able to support more connections and more variety of data packets such as images, videos and so on as the packet network grows. Some examples of basic and advanced services (e.g., pre-built blocks) the service provider may include are but are not limited to: a set-up call service, a bridge call service, an invoke presence server service, a call forward service, a call return service, a call transfer service, a call waiting service, a caller identification (ID) service, a repeat dial service, a speed dial service, a three-way call service, a voice mail service, a area code selection service, a call block service, a click-to-dial service, a conference call service, a find me service, an interactive voice response (IVR) service, a multi language IVR service, a pre-paid call service, a ring back service, and/or a ring tone service, and so on.

The service provider then defines the blocks of service logic for pre-building. For example, IVR and multi language IVR can be in separate pre-built blocks or IVR can be a specific configuration of the multi language IVR. The pre-built blocks are well defined and accomplish a specific function. It is also important to make sure the pre-built blocks are easy to understand. The pre-built blocks are then coded and made available for use by the customer.

The service provider also provides a framework and guideline for building the service logic to the customer. For example, a design framework can be a web based GUI with drag and drop capability. This approach allows a customer to simply drags and drops the pre-built blocks into the design framework and interconnects the blocks to create the service logic. The pre-built blocks are configurable by the customer to result in a specific flow. For example, a call forward pre-built block is configured to show the source and destination of the forwarded message. A customer could forward a call to another phone/IP address while another customer could choose to forward to a voice mail service.

The customer configures each pre-built block in the service logic and sends a request for activation to the service provider. The service provider verifies the completeness and accuracy of the service logic. If the service logic cannot be activated as designed by the customer, a response is sent to the customer and the service logic is modified. If the service logic is accurate and complete and permissible, the service provider executes the service logic and activates the service.

Figure 3:
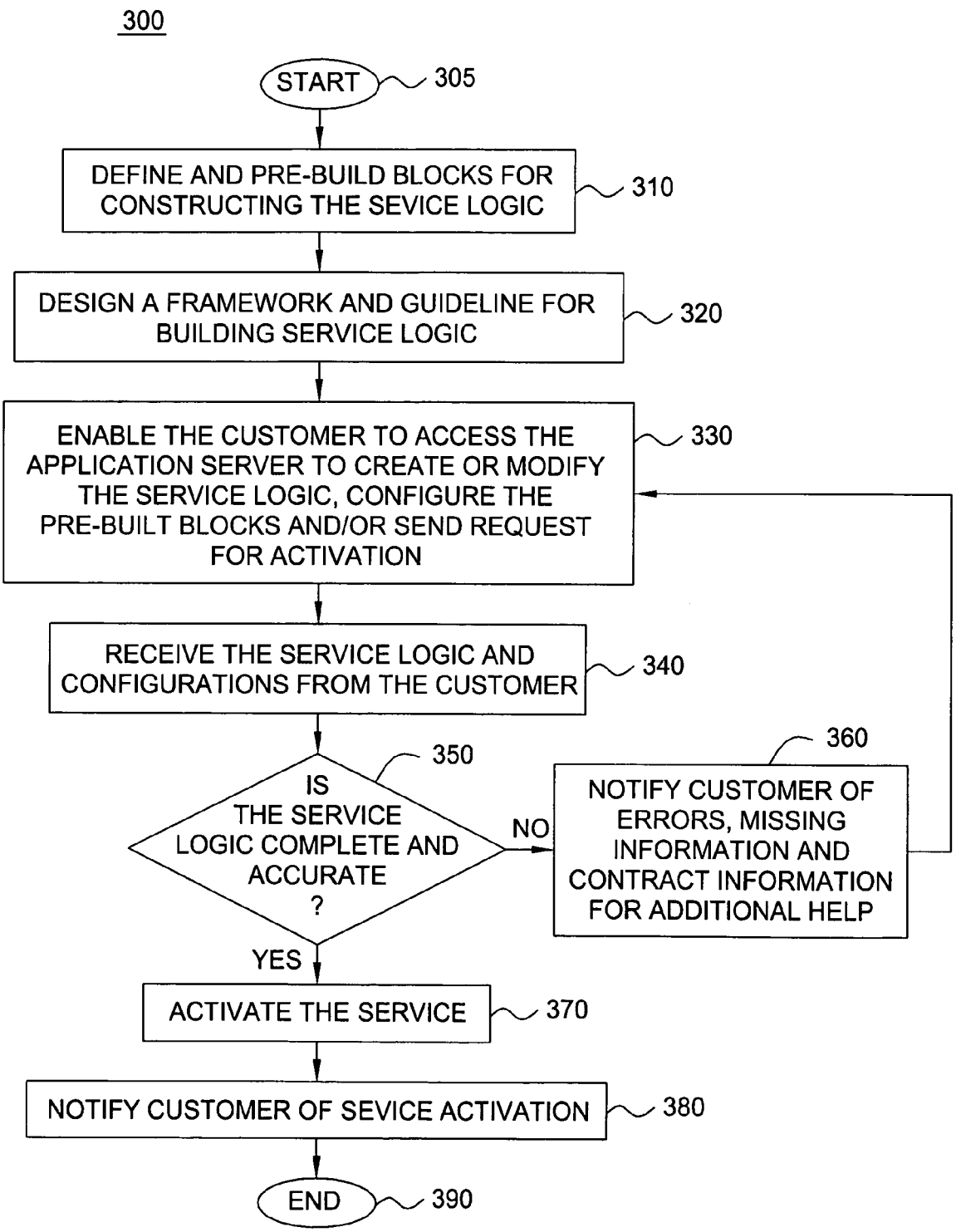
FIG. 3 illustrates a flowchart of the method for enabling the creation of customer specified service logic.

FIG. 3 illustrates the flowchart of the method 300 for enabling the creation of customer specified service logic. Method 300 starts in step 305 and proceeds to step 310.

In step 310, method 300 defines and pre-builds the blocks of service logic. For example, IVR (one language only) and multi language IVR can be defined to be in separate pre-built blocks or the simpler one language IVR can be a specific configuration of the multi language IVR. The pre-built blocks are designed to be easy to understand, well defined and accomplish a specific function. The pre-built blocks are then coded and made available for use by the customer to construct service logic for basic and advanced services.

In step 320, method 300 designs a framework and guideline to be used by the customer for building the service logic. For example, a design framework can be a web based GUI with drag and drop capability. The customer then drags and drops the pre-built blocks into the design framework and interconnects the blocks to create the service logic. For example, invoke presence server can be a pre-built block to determine whether a call can be forwarded to an IP or telephone address. The invoke presence server pre-built block is then followed by a call forward pre-built block in the design framework. Therefore, sequencing the presence pre-built block and the call forwarding pre-built block in the order described above, can support a service feature that first determines whether a call recipient is reachable and then forwards the call if only the person is reachable.

In step 330, method 300 enables the customer to access the application server, create or modify the service logic, configure the pre-built blocks and/or send request for activation to the service provider. If the customer already had service logic, the customer can modify the existing logic. If the customer does not have service logic or the customer is new, the service logic is created using the framework, guideline and pre-built blocks designed in step 320. The pre-built blocks of service logic are configurable by the customer to result in a specific flow. For example, a call forward pre-built block is configured to specify the source and destination for the forwarding of the call. The service provider determines the functionality included in each block. A call forwarding pre-built block can require configuring of only addresses or can include other conditions such as time of effect. It could also include multiple instructions for different conditions. For example, a customer may request calls to be forwarded to cellular phone during business hours and to an answering service during out of office hours. Although the service provider determines the basic functionality of each pre-built block, it is up to the customers to build the service logic, to configure each pre-built block to meet their need and to send requests for activation to the service provider.

In step 340, method 300 receives the service logic and configuration from the customer. Note that the service provider may include defaults for some configurations. For example, a feature such as area code selection can be provided with a default to select the local area code. Thus, the customer needs to change it only if selecting an area code from a different locality. The method then proceeds to step 350.

In step 350, method 300 determines whether the service logic is complete and accurate. Namely, the service provider must determine whether the customer constructed service logic is permissible. It should be noted that depending of the specified service, one or more pre-built blocks will need to be specified. If the service logic is complete and accurate, the method proceeds to step 370 to activate the service. If the service logic is incomplete or contains errors, the method proceeds to step 360 to notify the customer of errors.

In step 360, method 300 notifies the customer of errors. The service provider can also add contact information for obtaining additional help with the message. The contact information will allow a customer to speak with a customer care agent to discuss the detected errors. The method then returns back to step 330 to enable the customer to modify the service logic, to reconfigure the pre-built blocks and to resend request for activation. Therefore, if the service logic cannot be activated as designed by the customer, a response is sent to the customer and the customer again modifies the service logic.

In step 370, the service provider executes the service logic and activates the service. The method then proceeds to step 380.

In step 380, method 300 notifies the customer of the service activation. In one embodiment, the service provider includes a summary of the activated service in the notification. The method then ends in step 390.

Figure 4:
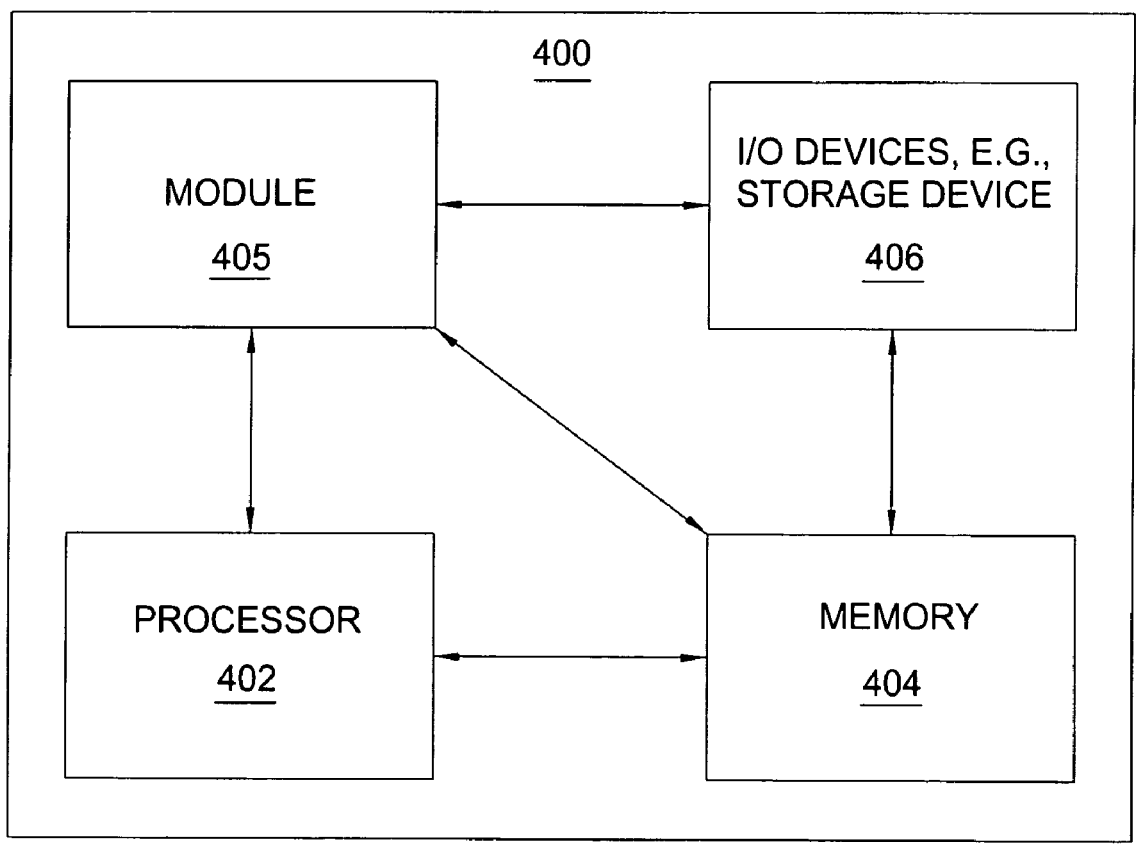
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for enabling the creation of customer specified service logic, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general purpose computer or any other hardware equivalents. In one embodiment, the present module for enabling the creation of customer specified service logic or process 405 can be loaded into memory 404 and executed by processor 402 to implement the functions as discussed above. As such, the present method 405 for enabling the creation of customer specified service logic (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for allowing a customer to specify at least one service logic in a communication network, comprising:
    presenting a plurality of pre-built blocks to the customer, wherein at least one parameter of each of said plurality of pre-built blocks is configurable by the customer;
    receiving at least one of said plurality of pre-built blocks as being selected for supporting said at least one service logic;
    verifying whether said at least one service logic is complete; and
    activating a service associated with said at least one service logic if said at least one service logic is complete.

2. The method of claim 1, wherein said communication network is a Voice over Internet Protocol (VoIP) network or a Service over Internet Protocol (SoIP) network.

3. The method of claim 1, further comprising:
    notifying the customer if said at least one service logic is incomplete based upon said at least one of said pre-built blocks that has been selected.

4. The method of claim 3, further comprising:
    allowing the customer to modify said at least one of said plurality of pre-built blocks or to select a different pre-built block from said plurality of pre-built blocks.

5. The method of claim 1, wherein said plurality of pre-built blocks comprise at least two of: a set-up call service, a bridge call service, an invoke presence server service, a call forward service, a call return service, a call transfer service, a call waiting service, a caller identification (ID) service, a repeat dial service, a speed dial service, a three-way call service, a voice mail service, a area code selection service, a call block service, a click-to-dial service, a conference call service, a find me service, an interactive voice response (IVR) service, a multi language IVR service, a pre-paid call service, a ring back service, or a ring tone service.

6. The method of claim 1, wherein said presenting comprises:

presenting said plurality of pre-built blocks in at least one of: a web based interface, a natural language interface, or a visual display interface.

7. The method of claim 6, wherein said visual display interface comprises a graphical user interface (GUI) having a drag and drop function that allows the customer to drag and drop at least one of said plurality of pre-built blocks in constructing said at least one service logic.

8. A computer-readable medium having stored thereon a plurality of instructions, the plurality of instructions including instructions which, when executed by a processor, cause the processor to perform the steps of a method for allowing a customer to specify at least one service logic in a communication network, comprising:

presenting a plurality of pre-built blocks to the customer, wherein at least one parameter of each of said plurality of pre-built blocks is configurable by the customer;

receiving at least one of said plurality of pre-built blocks as being selected for supporting said at least one service logic;

verifying whether said at least one service logic is complete; and activating a service associated with said at least one service logic if said at least one service logic is complete.

9. The computer-readable medium of claim 8, wherein said communication network is a Voice over Internet Protocol (VoIP) network or a Service over Internet Protocol (SoIP) network.

10. The computer-readable medium of claim 8, further comprising:

notifying the customer if said at least one service logic is incomplete based upon said at least one of said pre-built blocks that has been selected.

11. The computer-readable medium of claim 10, further comprising:

allowing the customer to modify said at least one of said plurality of pre-built blocks or to select a different pre-built block from said plurality of pre-built blocks.

12. The computer-readable medium of claim 8, wherein said plurality of pre-built blocks comprise at least two of: a set-up call service, a bridge call service, an invoke presence server service, a call forward service, a call return service, a call transfer service, a call waiting service, a caller identification (ID) service, a repeat dial service, a speed dial service, a three-way call service, a voice mail service, a area code selection service, a call block service, a click-to-dial service, a conference call service, a find me service, an interactive voice response (IVR) service, a multi language IVR service, a pre-paid call service, a ring back service, or a ring tone service.

13. The computer-readable medium of claim 8, wherein said presenting comprises:

presenting said plurality of pre-built blocks in at least one of: a web based interface, a natural language interface, or a visual display interface.

14. The computer-readable medium of claim 13, wherein said visual display interface comprises a graphical user interface (GUI) having a drag and drop function that allows the customer to drag and drop at least one of said plurality of pre-built blocks in constructing said at least one service logic.

15. An apparatus for allowing a customer to specify at least one service logic in a communication network, comprising:

means for presenting a plurality of pre-built blocks to the customer, wherein at least one parameter of each of said plurality of pre-built blocks is configurable by the customer;

means for receiving at least one of said plurality of pre-built blocks as being selected for supporting said at least one service logic;

means for verifying whether said at least one service logic is complete; and means for activating a service associated with said at least one service logic if said at least one service logic is complete.

16. The apparatus of claim 15, wherein said communication network is a Voice over Internet Protocol (VoIP) network or a Service over Internet Protocol (SoIP) network.

17. The apparatus of claim 15, further comprising:

means for notifying the customer if said at least one service logic is incomplete based upon said at least one of said pre-built blocks that has been selected.

18. The apparatus of claim 17, further comprising:

means for allowing the customer to modify said at least one of said plurality of pre-built blocks or to select a different pre-built block from said plurality of pre-built blocks.

19. The apparatus of claim 15, wherein said plurality of pre-built blocks comprise at least two of: a set-up call service, a bridge call service, an invoke presence server service, a call forward service, a call return service, a call transfer service, a call waiting service, a caller identification (ID) service, a repeat dial service, a speed dial service, a three-way call service, a voice mail service, a area code selection service, a call block service, a click-to-dial service, a conference call service, a find me service, an interactive voice response (IVR) service, a multi language IVR service, a pre-paid call service, a ring back service, or a ring tone service.

20. The apparatus of claim 15, wherein said presenting comprises:

presenting said plurality of pre-built blocks in at least one of: a web based interface, a natural language interface, or a visual display interface.

\* \* \* \* \*